United States Patent [19]

Murakami

[11] Patent Number: 4,669,965
[45] Date of Patent: Jun. 2, 1987

[54] MULTI-LAYER EXTRUSION DIE
[75] Inventor: Kenkichi Murakami, Osaka, Japan
[73] Assignee: Kabushiki Kaisha Plastic Kogaku Kenkyusho, Osaka, Japan
[21] Appl. No.: 648,223
[22] Filed: Sep. 7, 1984
[30] Foreign Application Priority Data Sep. 8, 1983 [JP] Japan .............................. 58-166166
Mar. 12, 1984 [JP] Japan .............................. 59-47531

[51] Int. Cl.⁴ .............................................. B29C 47/16
[52] U.S. Cl. .................................. 425/133.5; 264/171; 425/466
[58] Field of Search ............... 425/130, 131.1, 132, 425/133.5, 190–192 S, 376 R, 381, 462, 465, 466; 264/171; 118/410, 411

[56] References Cited

U.S. PATENT DOCUMENTS

| | | | |
|---|---|---|---|
| 3,005,440 | 10/1961 | Padday | 425/133.5 |
| 3,151,356 | 10/1964 | Senecal | 425/133.5 |
| 3,480,998 | 12/1969 | Von Erdberg | 425/133.5 |
| 3,559,239 | 2/1971 | Work et al. | 425/133.5 |
| 4,047,868 | 9/1977 | Kudo et al. | 425/381 |
| 4,165,210 | 8/1979 | Corbett | 425/133.5 |
| 4,469,782 | 9/1984 | Ishiwata et al. | 264/176 R |
| 4,533,308 | 8/1985 | Cloeren | 425/133.5 |

FOREIGN PATENT DOCUMENTS

51-68670 6/1976 Japan ............................... 425/133.5

Primary Examiner—Jay H. Woo
Assistant Examiner—J. Fortenberry
Attorney, Agent, or Firm—Armstrong, Nikaido, Marmelstein & Kubovcik

[57] ABSTRACT

A multi-layer extrusion die comprising an integrate consisting of widening plates; each widening plate having respective flow passage for resin, the flow passage having inlet portion and downstream portion, the downstream portion being widened in the transverse direction and flat, a die body holding the integrate, and having a flat flow passage which combines outlets of the downstream portions, and a converter mounted on the inlet portion side of the integrate. The structure of the die is simplified and the cost becomes cheap.

13 Claims, 12 Drawing Figures

MULTI-LAYER EXTRUSION DIE

BACKGROUND OF THE INVENTION

The present invention relates to a multi-layer extrusion die, and, more particularly, to the die which is used by being connected with an extruder for extruding synthetic resin (hereinafter referred to as "resin") in order to form a multi-layer sheet.

Hetherto, there are known several types of such multi-layer extrusion die. For example, Japanese Examined Patent Publication No. 1628/1974 disclosed a multi-layer extrusion die. The die is capable of forming a four-layer sheet by laying a two-layer sheet on the other two-layer sheet along a flow of resins. However, in the die there are some problems, e.g. a size of the die is large, a construction of the die is complicated and the production cost of the die is high.

Further as to a die disclosed in Japanese Examined Publication No. 6860/1975, though a structure of the die is relatively simple, an accuracy in thickness of each layer is not high. For example, the thickness of each layer is not uniform in the transverse direction.

Accordingly, there has been desired a multi-layer extrusion die which is simple in structure and capable of forming a multi-layer sheet with a high accuracy in thickness of each layer, particularly even in the transverse direction.

OBJECT OF THE INVENTION

The main object of the present invention is to provide a multi-layer extrusion die capable of forming a multi-layer sheet with high accuracy in thickness of each layer, particularly even in the transverse direction.

Other object of the invention is to provide a multi-layer extrusion die which is simple in structure and is cheap.

Another object of the invention is to provide a multi-layer extrusion die in which shapes of flow passages for resin are capable of being easily changed depending upon desired features of resin.

SUMMARY OF THE INVENTION

In accordance with the present invention, there can be provided a multi-layer extrusion die comprising: (a) a die body having an inlet end surface and an outlet end surface, being provided with a cavity opening on the inlet end surface, and having a flat flow passage connecting the cavity to the outlet end surface of the die body; (b) an integrate consisting of flow-width-widening plates (hereinafter referred to as "widening plate"), being contained in the cavity; each widening plate having a flow passage for resin; the flow passage including an inlet portion and a downstream portion which is widened in the lateral or transverse direction and is flat; and (c) a converter having a plurality of flow passages which are connected with the inlet portions of the integrate; whereby molten resins are guided into the flow passages of the integrate from the converter, a plurality of the molten resin layers are formed at the downstream portions of the widening plates, and the layers are laminated with each other through the flat flow passage of the die body so as to constitute a multi-layer sheet.

Therefore, the structure of the die is simplified and the production cost of the die can be reduced. A multi-layer sheet can be more easily made. Further, an accuracy becomes high in thickness of each layer even in the transverse direction.

In this specification, the term "sheet" includes "film".

Figure 1:
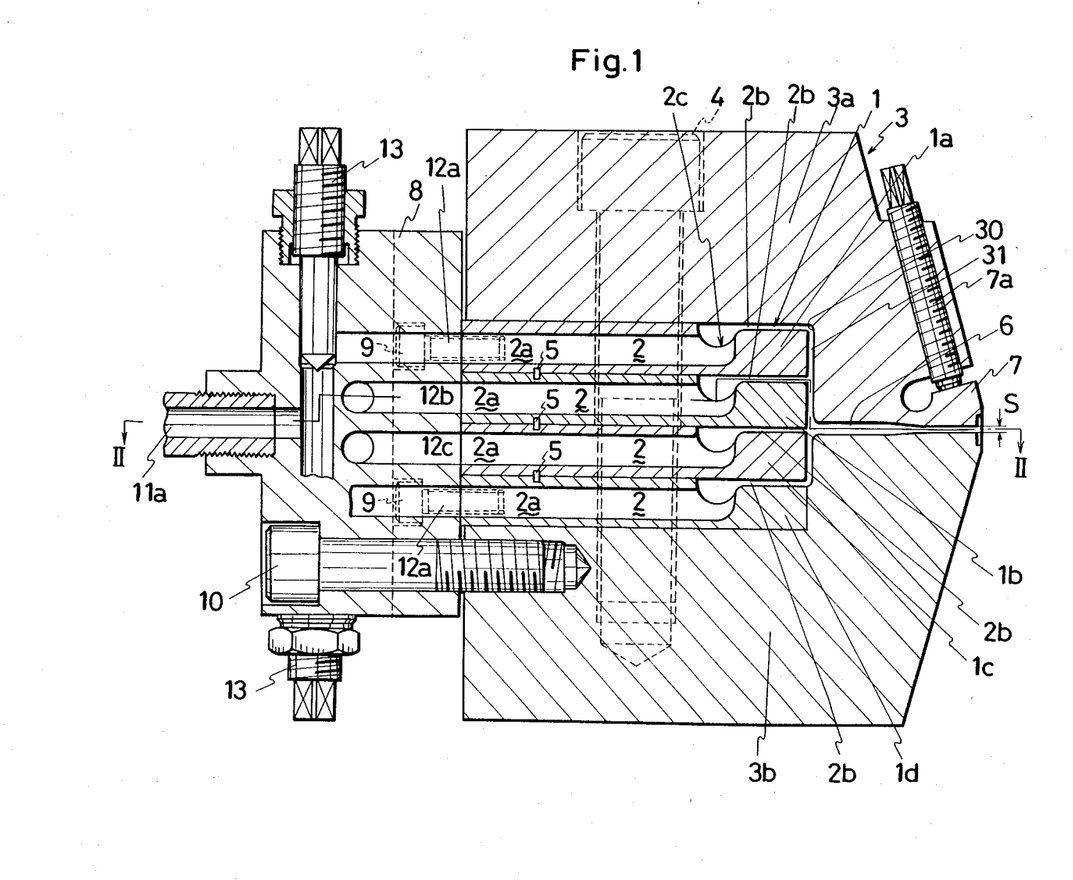
FIG. 1 is a longitudinal sectional view showing the first embodiment of a multi-layer extrusion die of the invention.
Figure 2:
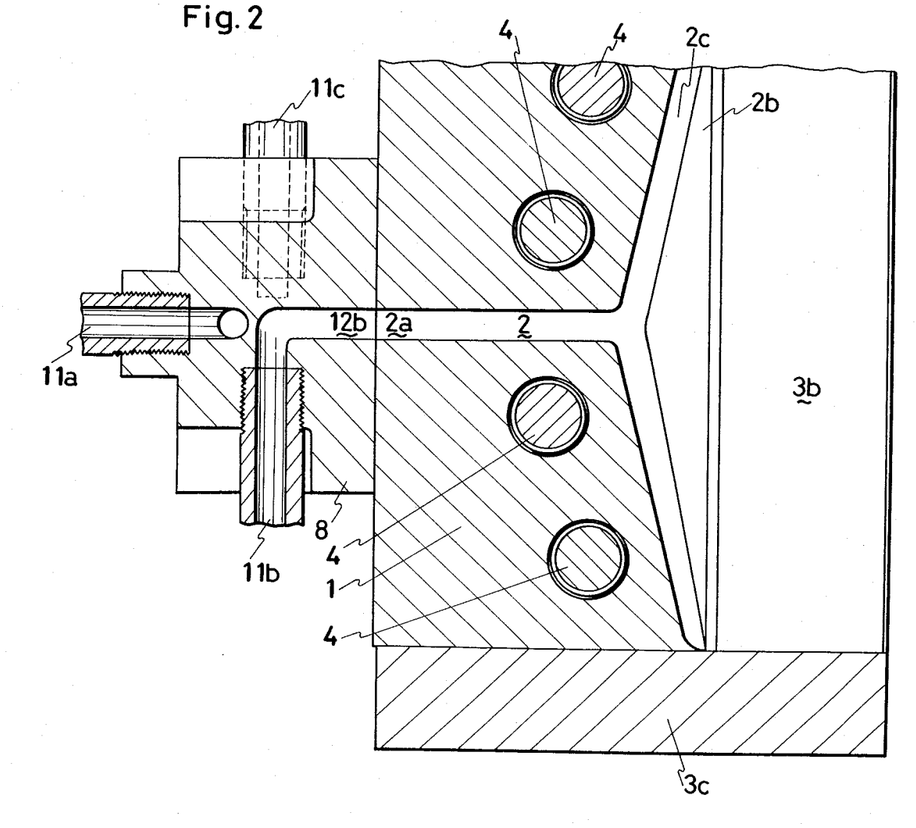
FIG. 2 is a sectional view taken along line II—II of FIG. 1.

The term "flow-width-widening plate" or "widening plate" means a plate for widening the width of resin flow in the lateral or transverse direction, for example, as shown in FIGS. 1 and 2 with reference numerals 1a, 1b, 1c and 1d.

The term "integrate" means a plurality of the widening plates which are piled and fixed with each other.

The term "lateral" means a direction at an angle as great as 90° to the main course of the resin flow.

The above and other object and advantages of the present invention will become apparent from the following description with reference to the accompanying drawings.

DETAILED DESCRIPTION OF THE INVENTION

Figure 3:
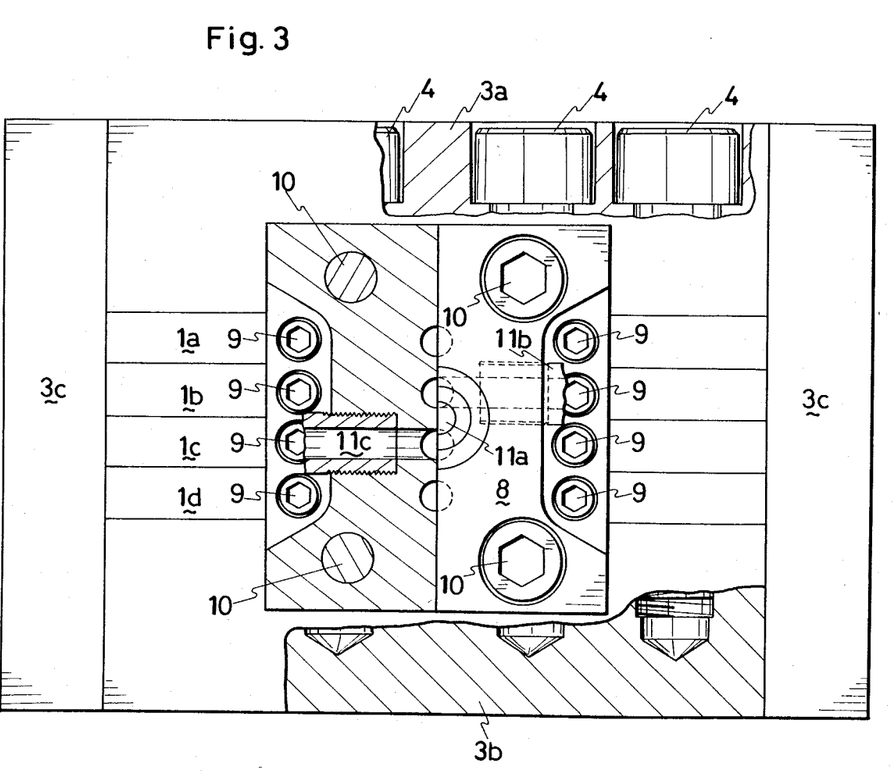
FIG. 3 is a partially cut-away front view showing the first embodiment of the multi-layer extrusion die of the invention.

FIGS. 1 to 3 show the first preferred embodiment of the invention.

Numeral 1 indicates an integrate consisting of widening plates 1a, 1b, 1c and 1d. The widening plates 1a, 1b, 1c and 1d are formed in the same configuration with each other. Namely, the size, excepting thickness, of each widening plate is equal to each other, and the figure and size of each flow passage, mentioned later, is similar to each other. Though only the widening plate 1a will be described hereinafter, it should be understood that other widening plates 1b, 1c, 1d are the same as 1a.

A flow passage 2 is provided within the widening plate 1a. A cross sectional configuration of the flow passage 2 is a circle at an inlet portion 2a which is shown at the left hand side in FIG. 1 and FIG. 2. A downstream portion 2b, which is shown at the right hand side in FIG. 1 and FIG. 2, of the flow passage 2 is provided so as to be a flat hollow opening on the upper surface of the widening plate 1a, as shown in FIG. 1. As shown in FIG. 2, the downstream portion 2b is widened in the transverse direction and is flat.

In this specification, a term "flat hollow" means a portion of a flat square widening plate, which is formed by cutting the upper surface of the front side of the widening plate in the direction of resin flow, from the front end to 1/5-½ position in the longitudinal length of the widening plate, in parallel with the upper surface, into the same depth as thickness of a desired resin layer to be formed, over all the width of the widening plate, so that a wide area gap having substantially uniform clearance between the surface of the above portion and the lower surface of the other widening plate is obtained when the other widening plate is piled on the upper surface of the above widening plate, and also means portions similar to the above-described portion.

Figure 8:
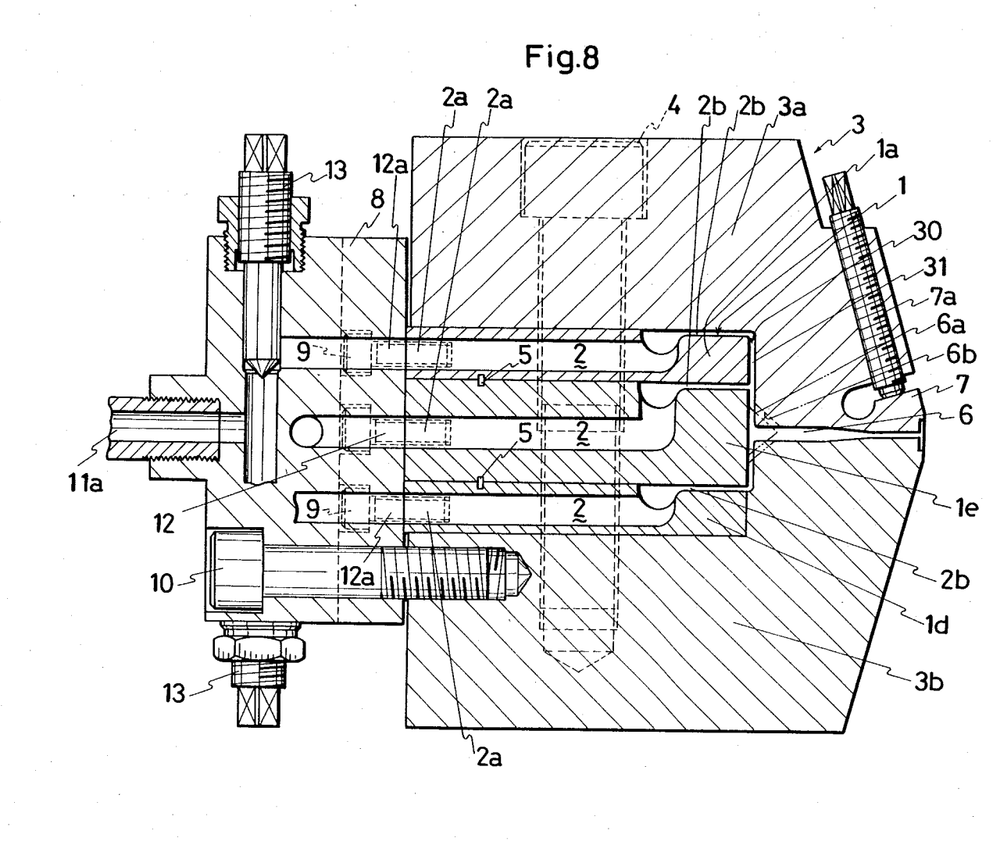
FIG. 8 is a longitudinal sectional view showing the second embodiment of a multi-layer extrusion die of the invention.

However, the above widening plate is not limited to a square form in plan configuration, and includes a widening plate 1e having a partial projection as shown in FIG. 8, or the like.

Figure 10:
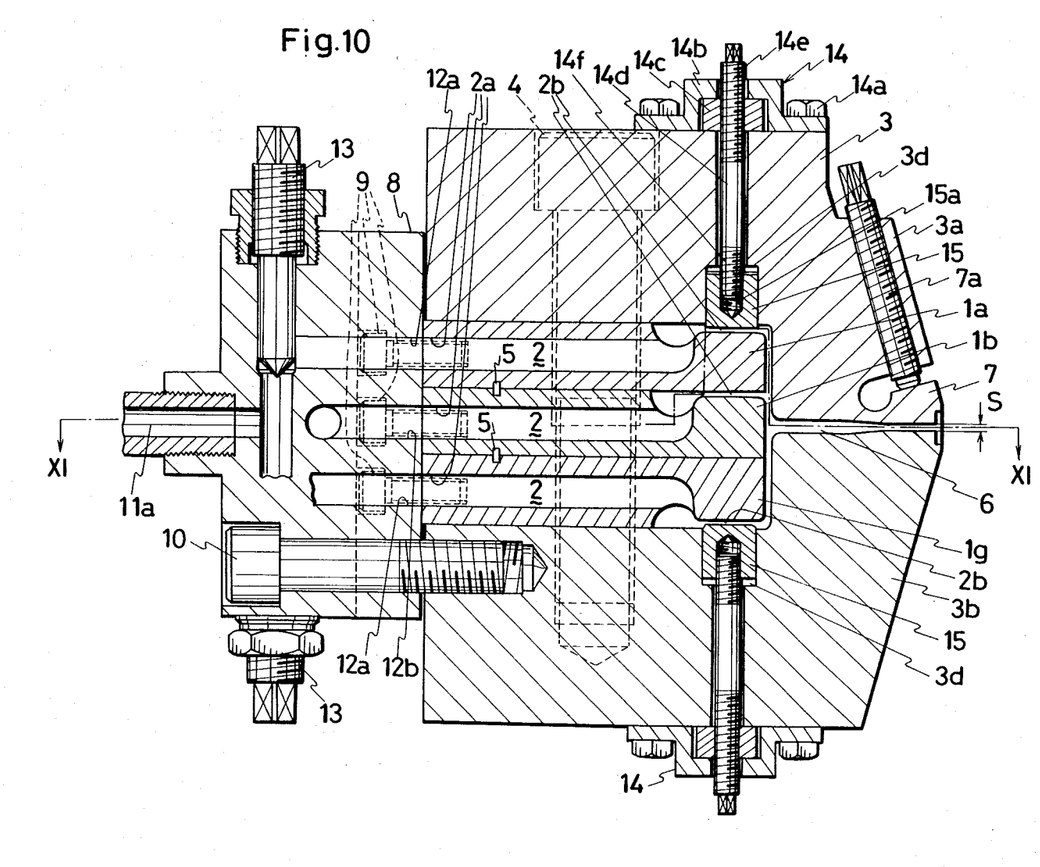
FIG. 10 is a longitudinal sectional view showing further another embodiment of a multi-layer extrusion die of the invention.

Though the widening plate being piled upon the other widening plate is shown in the above explanation, the flat hollow can be formed at a lower surface of the widening plate. In that case, the lower surface is contacted with an upper flat surface of the other widening plate or an inner surface of a cavity of a die body, as shown in FIG. 10.

Though the lower surface of the other widening plate is contacted with the upper surface of the widening plate in the above explanation, an inner surface of a cavity of the die body can be replaced instead of the upper surface of the other widening plate.

Though the flat hollow is provided on upper surface of the widening plate, in the above explanation, in case widening plate is divided into upper and lower halves, the flat hollow can be provided on upper surface of the lower half and/or lower surface of the upper half, instead of a widening plate itself, as described later with reference to FIGS. 4 to 6.

Though the depth of the flat hollow is substantially uniform in the transverse direction in the above explanation, the depth of the flat hollow is not limited to that case. The depth of the flat hollow can be made to be shallow in the center, as described later.

Figure 11:
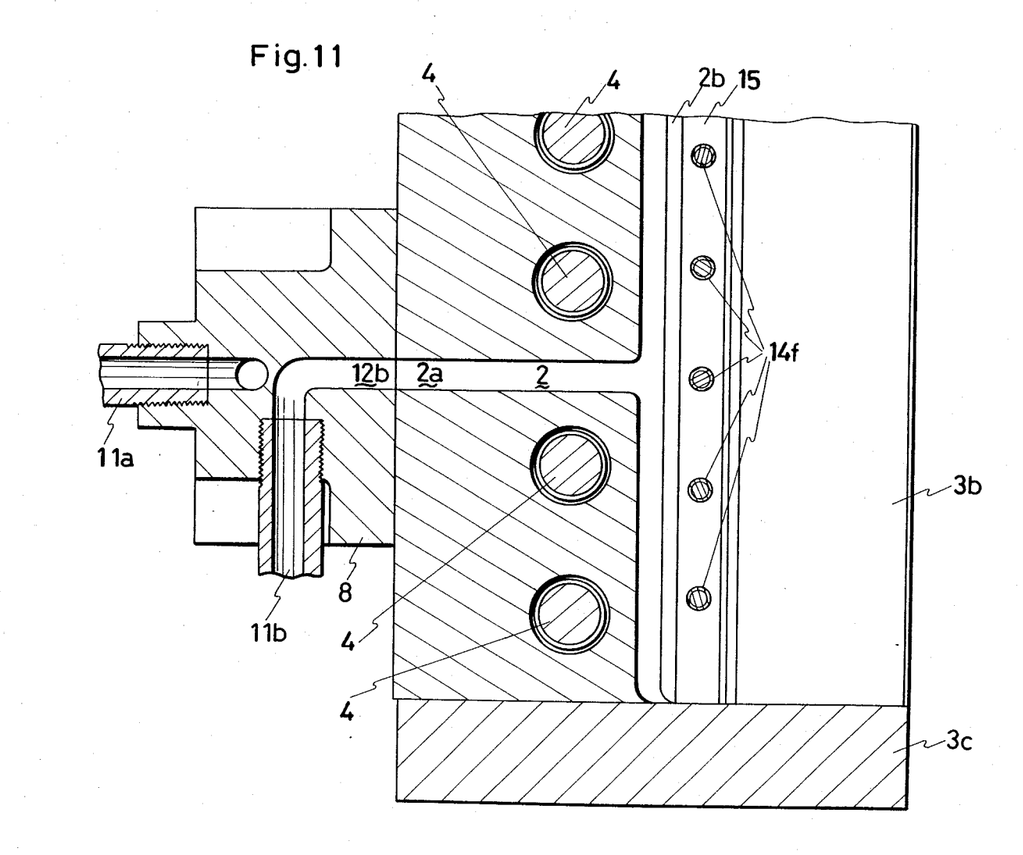
FIG. 11 is a sectional view taken along line XI—XI of FIG. 10.

The plan configuration of the flat hollow explained above can be provided either in a triangular form as shown in FIG. 2 or in a square form as shown in FIG. 11.

Accordingly, as shown in FIG. 1, when the whole widening plates 1a, 1b, 1c and 1d are piled up together so as to become an integrate 1, and the integrate 1 is inserted into a cavity 30 of a die body 3, a clearance or gap is formed between the bottom surface of the flat hollow of the downstream portion 2b and a surface of an adjacent member, e.g. a surface of an adjacent widening plate, an inner surface of the cavity 30, or the like.

Therefore, the clearance surves as a flow passage for molten resin.

In case that the flat hollow is provided on the surface of the widening plate as a downstream portion 2b, as shown FIGS. 1 to 3, there is an advantage that the downstream portion 2b can be easily formed. But the downstream portion 2b in the present invention is not limited to such a flat hollow as shown in FIGS. 1 to 3. As shown FIGS. 4 to 6, for example, a downstream portion 2b can be provided by means of perforating through a widening plate 16, 17 and 18, as a flat clearance or flat gap extending in the transverse direction. In that case, the widening plates 16, 17 and 18 can be divided into two halves 16a, 16b; 17a; 17b; and 18a, 18b, as shown in FIGS. 4 to 6.

Figure 4:
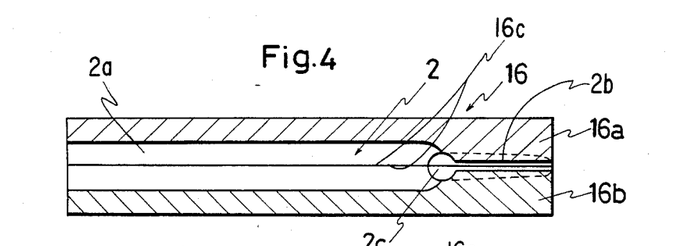
FIGS. 4 to 6 are longitudinal sectional views showing another embodiments of a widening plate in the present invention.

In case of FIG. 4, the inlet portion 2a and the downstream portion 2b are provided of the adjacent surfaces 16c of the two halves 16a, 16b, as grooves and flat hollows, respectively.

Figure 5:
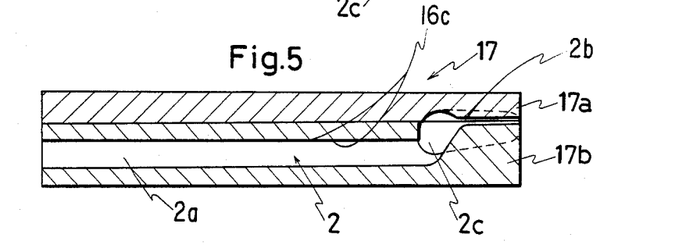
Figure 6:
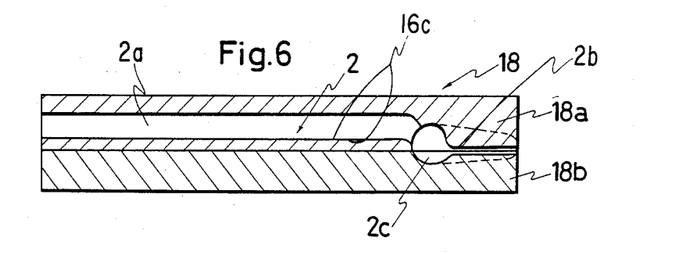

In case of FIGS. 5 and 6, the inlet portion 2a is a hole perforated through one of the halves, and the downstream portion is a flat hollow provided in the adjacent surfaces of the two halves.

In the above-mentioned widening plate 1a, as shown in FIGS. 1 to 6, when a manifold 2c is formed between the inlet portion 2a and the downstream portion 2b, the molten resin can be flowed more smoothly from the inlet portion 2a into downstream portion 2b. In the present invention, the manifold is not an essential element.

As shown in FIG. 2, for example, the manifold 2c is provided as a groove which extends in a coat-hanger form, and the downstream portion 2b has a flat triangular form in the plan view. In that case, the flow resistance of resin at the center of the downstream portion is increased as compared with the flow resistance in both side portions. Therefore, a layer of molten resin can be uniformalized in thickness even in the transverse direction.

Further, the cross sectional area of the manifold 2c decreases from the center portion toward outside ends, and the both ends of the manifold are closed.

In that case, at the center portion of the manifold 2c a great quantity of molten resin can be smoothly flowed toward the downstream portion 2b as well as the side end of the manifold 2c. At the side end portion of the manifold 2c, the remaining small quantity of molten resin can be smoothly flowed toward the downstream portion. Therefore, the pressure of the resin can be balanced along the manifold 2c.

Figure 7:
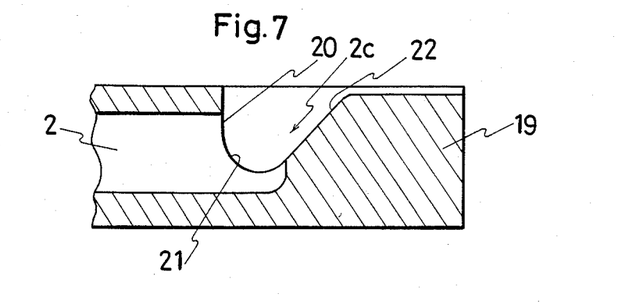
FIG. 7 is a partial sectional view showing an embodiment of a manifold in a widening plate in the present invention.

The cross sectional configuration of the manifold 2c can be formed, for example, as a semi-circle. FIG. 7 shows a preferred embodiment of a cross sectional configuration of a manifold 2c. In that case, the cross sectional configuration comprises a straight portion 20, an arc-shaped portion 21 and an inclined portion 22.

In FIGS. 1 to 3, a numeral 3 indicates a die body. The die body 3 comprises an upper part 3a, a lower part 3b and side lids 3c. The widening plates 1a, 1b, 1c and 1d are piled up one upon another so as to constitute an integrate 1 by means of being connected to a converter 8, or by another method, and the integrate 1 is contained in a cavity 30 of the die body 3, that is to say, is held between the upper part 3a and the lower part 3b. In that case, the flat hollow of each widening plate 1a, 1b, 1c, 1d is directed upward. Then the die body 3 and the widening plates are tied by bolt means 4,4,4,4 for bearing pressure of resin under extrusion. Further, each dowel 5 is adapted between those widening plates in order to position the widening plates 1a, 1b, 1c and 1d suitably. Both sides of the upper part 3a and the lower part 3b are covered with each side lid 3c by known clamping means.

The die body 3 is provided with a flat flow passage 6 at the position where the upper part 3a and the lower part 3b are connected to each other. Between the front end surface of the integrate 1 and an inner surface of the cavity 30, a gap or clearance is formed. The gap serves as a flow passage (hereinafter referred to as "flow-combining zone 31") for resin layers. At the flow-combining zone 31, layers formed in each widening plate are laminated with each other.

The flow-combining zone 31 is connected with a flat flow passage 6 of the die body 3. Each layer laminated at the flow-combining zone 31 is further laminated together so as to become a multi-layer sheet by being inserted through the flat flow passage 6.

The upper part 3a is provided with a flexible lip 7 at an outlet of the flat flow passage 6, and a gap (indicated as S) of the outlet of the flat flow passage 6 can be adjusted by screw means 7a.

A numeral 8 indicates a converter. Each widening plate 1a, 1b, 1c or 1d is connected to the converter 8 by means of bolts 9, 9. Those widening plates 1a, 1b, 1c and 1d and the converter 8 are connected to the die body 3 by means of bolts 10, 10.

The converter 8 has three inlets 11a, 11b and 11c in order to guide resin under pressure. The converter 8 is provided with flow passages having an inlet 11a and branches extending to outlets 12a, 12a. Each outlet 12a, 12a is connected to the corresponding inlet portion 2a, 2a of the widening plates 1a, 1d. Numerals 13, 13 indicate flow control valves which are positioned at each branch of the flow passage extending from the inlet 11a to each outlet 12a, 12a. Also, the converter 8 is provided with flow passages extending from the inlets 11b and 11c to outlets 12b and 12c, respectively. Each outlet 12b, 12c is connected with each inlet portion 2a, 2a of the widening plates 1b and 1c.

When one molten resin is supplied into the inlet 11a under pressure, the molten resin passes through the branches of flow passages, and each flow amount of the resin in each branch is adjusted by each flow control valve 13, 13. The molten resin flows into each inlet portion 2a, 2a of the widening plate 1a, 1d by the way of each outlet 12a, 12a. Lastly the resin reaches to the flat flow passage 6 by way of each flow passage in each widening plate 1a, 1d, the flat hollow of each downstream portion 2b, 2b and the flow-combining zone 31.

On the other hand, the other molten resins are guided into the inlets 11b, 11c, respectively, under pressure. The resins which are guided into the inlets 11b, 11c flow into the inlet portion 2a of the flow passage 2 in each widening plate 1b, 1c by way of each outlet 12b, 12c. Lastly the resins reach the flat flow passage 6 by way of each downstream portion 2b and the flow-combining zone 31.

As a result, a four-layer sheet is made. The layers consisting of two resins which are guided into the inlets 11b, 11c are sandwiched between the layers consisting of a resin which is guided into the inlet 11a.

In that case, at each flow passage of the widening plates 1a, 1b, 1c, 1d, resin has already been widened in the transverse direction and flattened. Each flattened resin is only laminated with each other at the flow-combining zone 31 and the flat flow passage 6 of the die body 3. Therefore, an accuracy, in thickness of each layer in the sheet extruded out of the flat flow passage 6 is high.

The integrate 1 is formed in an external figure according with the cavity 30 of the die body 3. The integrate 1 can be provided with several numbers of widening plates. The form of each flow passage of the widening plates can be designed in various shapes, particularly in thicknesses.

For example, in FIG. 1, an integrate 1 comprises of four widening plates 1a, 1b, 1c and 1d having similar thickness with each other, and is inserted into a cavity 30 of the die body 3. The extrusion die can extrude a four-layer sheet. An integrate 1 shown in FIG. 8 includes a widening plate 1e, instead of two widening plates 1b, 1c in FIG. 1. The widening plate 1e has a double thickness of the widening plate 1b.

The multi-layer extrusion die of FIG. 8 can form a three-layer sheet. In the present invention, if necessary, a spacer plate (not shown), instead of a widening plate, can be employed as an element of the integrate 1.

In the embodiments of the multi-layer extrusion die of the present invention, when thickness of a certain layer is desired to be changed, the corresponding widening plate is changed to the other widening plate having a flat hollow which is different in depth from the flat hollow of the original widening plate. Such change of the widening plate can be easily accomplished, when the external dimensions of the widening plates are standardized in the same size.

In the multi-layer extrusion die of the invention, when a choker bar which can be controlled from outside of the die, as described later, is employed, the thickness and uniformity of each resin layer can be controlled in the course of extrusion without changing the widening plate.

Figure 9:
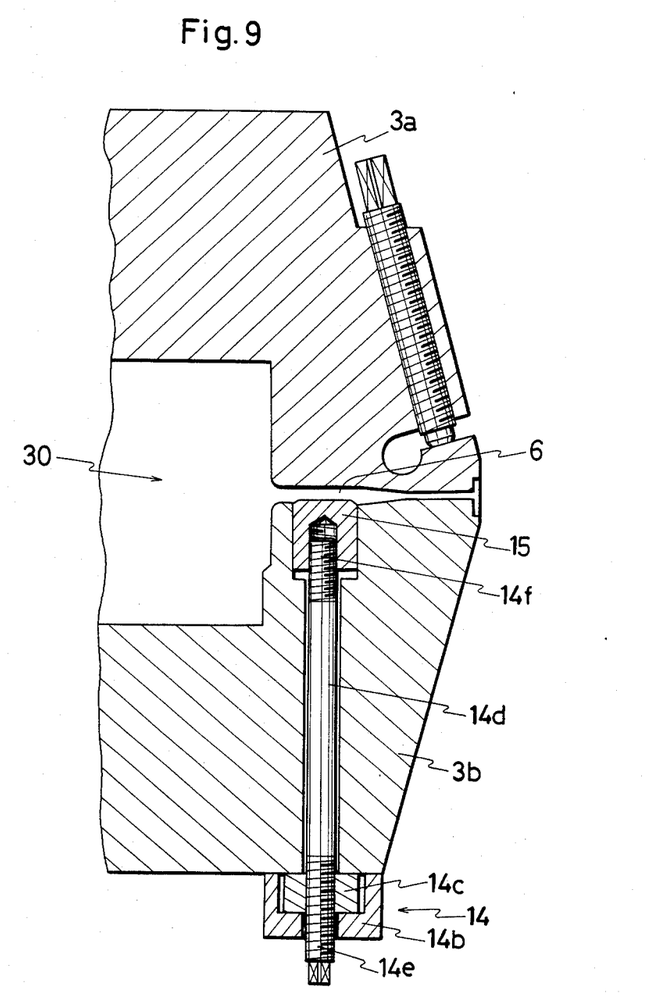
FIG. 9 is a partial sectional view showing another embodiment of a multi-layer extrusion die of the invention.

In a multi-layer extrusion die of the present invention, as shown in FIG. 9, a choker bar 15 can be provided on the flat flow passage 6, so that thickness of an extruded laminated sheet and uniformity of the thickness in the transverse direction of the sheet can be precisely controlled.

Furthermore, as shown in FIG. 10, when choker bars 15, 15 are provided on downstream portions 2, 2 of widening plates 1a, 1g, the thickness of each layer composing the laminated sheet and uniformity of the thickness, even in the transverse direction, of the layer can be precisely controlled prior to the lamination of layers.

As shown in FIGS. 9 to 11, each numeral 14 indicates a means for supporting the choker bar 15 (hereinafter referred to as "supporting means"), which is installed in each of the upper part 3a or the lower part 3b of the die body 3. The supporting means 14 includes a bracket 14b fixed to the die body 3 by bolt means 14a, a nut 14c being held between the bracket 14b and the die body 3, a male screw rod 14d associated with the nut 14c, and a female screw portion 15 which is cut in the choker bar 15.

The choker bar 15 is contained in a channel 3d which is dug in each inside of the upper part 3a and the lower part 3b of the die body 3 and extends in the transverse direction, so as to face the flat flow passage or the flat hollow of the downstream portion 2b over all the width. Both of ends of the choker bar 15 come to contact with both of the side lids 3c.

Hereinafter, the choker bar 15 is explained with reference to FIGS. 10 and 11.

In that case, five male screw rods 14d of the supporting means 14 are set in the longitudinal direction of the choker bar 15. The male screw rod 14d is provided with an outer male screw portion 14e and an inner male screw portion 14f. A pitch of the outer male screw portion 14e and a pitch of the inner male screw portion 14f are a little different with each other. The nut 14c receives the outer male screw portion 14e of the male screw rod 14d, and the female screw portion 15a of the choker bar 15 receives the inner male screw portion 14f of the male screw rod 14d. Such construction is known as a differential screw means.

With respect to the widening plates 1a and 1g, the bottom surfaces of the flat hollows of the downstream portions 2b is uniformly flat in the transverse direction. The choker bar 15 facing the bottom surface of the hollow, can be bended and slightly curved by the supporting means 14, so that the center portion of the choker bar projects toward the bottom surface, and therefore the gap space between the bottom surface and the choker bar 15 at the center portion thereof is reduced, and the flow resistance of the molten resin in the center portion is increased as compared with the resistance in both side portions. As a result, the flow of the molten resin on the downstream portion 2b is uniformalized in the transverse direction.

In FIG. 10, though the widening plate 1b has no choker bar, the flow of the molten resin is uniformalized in the transverse direction, for example, by reducing the depth of the center portion of the flat hollow of downstream portion 2b as compared with both side portions of the flat hollow.

As to the supporting means 14, the differential screw means can be substituted for another screw means or another known means.

In detail, when each male screw rod 14d is rotated from the outside, the choker bar 15 is pushed or pulled to be bended by a head of the male screw 14d in accordance with the difference of pitches per one rotation of the male screw rod 14d between the male screw portion 14e and the male screw portion 14f. The flow resistance is adjusted by means of reducing the gap space at the center portion of each downstream portion of each widening plate 1a, 1g as compared with the gap space at both of the side portions in the transverse direction. In the die shown in FIG. 10, if desired, a choker bar can be employed also in the central widening plate 1b, for example, after the manner of widening plate 1i in FIG. 12. In that case, all layers can be adjusted to predetermined thickness in the course of extrusion.

In the above explanation, there is mainly described with respect to a die for making a three-layer sheet. In case more-than-three-layer sheet is desired, it is attained by means of employing the number of widening plates corresponding to the desired number of layers. In that case, the employed die would be constructed in the same way as the die shown in FIGS. 10 and 11.

Hereinafter a die for making a five-layer sheet will be explained with reference to FIG. 12.

Figure 12:
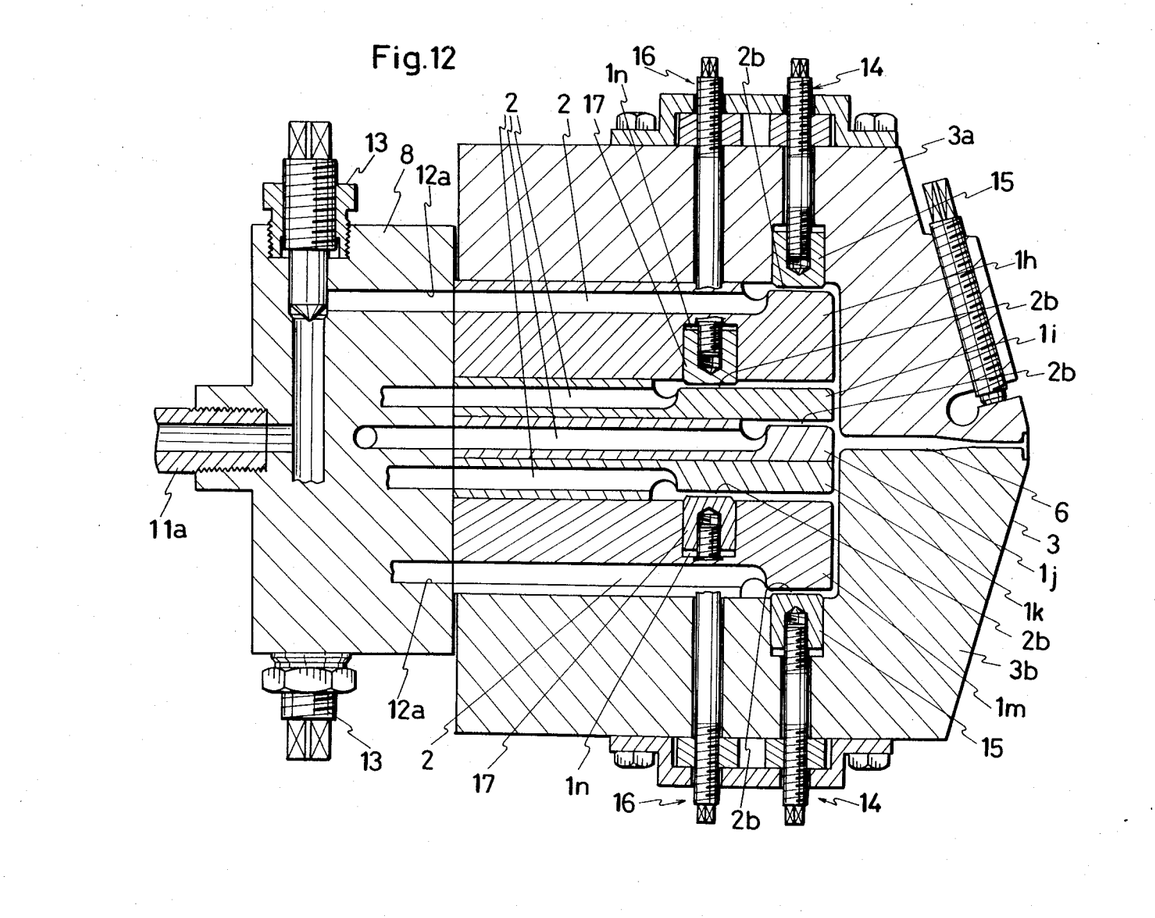
FIG. 12 is a longitudinal sectional view showing more further another embodiment of a multi-layer extrusion die of the invention.

The die shown in FIG. 12 has five widening plates 1h, 1i, 1j, 1k and 1m. As to each widening plate 1h, 1m, a gap space of a passage at the flat hollow of downstream portion 2b of each flow passage 2 can be adjusted with the choker bar 15 which is supported by the supporting means 14 installed in the die body 3, the same as the embodiment in FIG. 10. Further in FIG. 10, resin which passes through each widening plate 1h, 1m is pressed into the inlet 11a and diverged, so that each flow amount is adjusted by each flow control valve 13. With respect to widening plates 1i, 1k, the flat hollow of the downstream portion 2b of each flow passage 2 is located at the rear poryion of the flat hollow of each widening plate 1h, 1m as shown at the left hand side of FIG. 4. Each choker bar 17 which is supported by the corresponding supporting means 1t connected with the die body, opposes to the bottom surface of the flat hollow of the downstream portion 2b of each widening plate 1i, 1k. Each supporting means 16 is penetrated through each widening plate 1h, 1m so as to avoid the flow passages of the widening plates 1h, 1m and is arranged at plural positions in the transverse direction. Each choker bar 17 is contained in each channel ln which is dug on the inside of each widening plate 1h, 1m in the transverse direction, and both ends of the choker bar 17 come to contact with the side lids 3c.

An inlet of a flow passage, branches of the flow passage and each flow control valve in the branches, which guide resin to each inlet portion of the widening plates 1i, 1k, are provided in the converter 8, the same as the inlet 11a, the branches 12a and the flow control valve 13, and are disposed with a small distance in the transverse direction from the corresponding inlet 11a, the branches 12a and the flow control valve 13, and in substantially parallel with the inlet 11a, the branches 12a and the flow control valve 13.

The construction of the flat hollow of the downstream portion 2b of the widening plate 1j and the flow passage for resin which is guided into the widening plate 1j are similar to the widening plate 1f in FIG. 10.

As shown by means of two dots chain line in FIG. 8, if an end surface of downstream side of the integrate 1 has a tapered projection 6a having a triangular cross section, and the flat flow passage 6 has a tapered cavity 6b, the flow of resin is extruded more smoothly through gaps between the tapered projection 6a and the tapered cavity 6b, since stagnation point is avoided.

The die for making a five-layer sheet consisting of three kinds of resin, can control to uniformalize the thickness of each layer, particularly can control to uniformalize a distribution of the thickness in the transverse direction by each supporting means 14, 14, 16, 16 on the bases of the thickness of the layer extruded by way of the widening plate 1j.

In respective above-mentioned embodiments of the invention, when widening plates are formed in the same size excepting the thickness, particularly in the same measuring in length and width, the widening plates can be easily changed depending upon a desired multi-layer sheet. For example, if a plurality of widening plates provided with flow passages having various measures and one die body 3 are prepared, a laminated sheet having each uniformalized layer's thickness can be easily made depending upon the features of synthetic resin. Also, if a plurality of widening plates having various thicknesses and various converters 8 are prepared, a sheet having optional number of layers can be made. Further, the choker bar and the supporting means can be adapted to the widening plate located in the middle position (widening plates 1i, 1k in FIG. 12) of a plurality of widening plates.

As described above, the die body holds a plurality of widening plates which are provided with the flow passages having the flat downstream portions and piled up with each other corresponding to the number of sheet's layers, whereby the structure of the die is simplified and the production cost of the die is reduced. Further, the process for making a widening plate is simple, when the downstream portion of the flow passage of each widening plate is formed as a flat hollow in a surface of the widening plate.

The resin layers extruded from the flow passages are only laminated at the flow-combining zone and the flat flow passage of the die body. Therefore, an accuracy in thickness of each layer is high as compared with a multi-layer sheet which is formed by a conventional die. When the die includes an adjustable choker bar which faces the flat flow passage or the flat hollow of the downstrem portion of the widening plate and can be bended by a supporting means, the thickness of each layer in the transverse direction can be adjusted in the course of extrusion. Also, in that case, each layer, excepting a center layer (third layer in FIG. 7), can be adjusted in thickness. Therefore each layer's thickness can be uniformalized by means of controlling the thickness of each layer.

Though several embodiments of the invention are described in detail, it is to be understood that the present invention is not limited to the above embodiments, and various changes and modifications may be made in the invention without departing from the spirit and scope thereof.

What is claimed is:

1. A multi-layer extrusion die comprising:
   (a) a die body having a cavity opening therein, and a flat flow passage from said cavity opening to an outlet from said die block;
   (b) an integrate disposed in said cavity opening, said integrate including a plurality of superimposed widening plates defining flow passages in parallel relationship for molten resin, each of said flow passages having an inlet portion in communication with an inlet passage through said die body, and a downstream portion widened in the lateral direction to a width equal to that of the flat flow passage of the die body and in communication with said flat flow passage; and
   (c) a converter having flow passages connected with said flow passages of said widening plates, whereby molten resins are flowed into said flow passages of said integrate, a plurality of resin layers are formed at said downstream portions of said widening plates, and said layers are united to form a multi-layer sheet in passing through the flat flow passage of said die body.

2. The multi-layer extrusion die of claim 1, wherein a flow-combining zone is provided between an end surface of said integrate and an inner surface of said cavity.

3. The multi-layer extrusion die of claim 1 wherein said widening plate is provided with a manifold in said flow passage at a portion between said inlet portion and said downstream portion.

4. The multi-layer extrusion die of claim 1 wherein said downstream portion of said flow passage is provided as a hollow opening on a surface of said widening plate extending in the lateral direction.

5. The multi-layer extrusion die of claim 1, wherein one of said widening plates has two halves, and said downstream portion is provided on adjacent surfaces of said halves.

6. The multi-layer extrusion die of claim 1, wherein said widening plates have substantially the same length with each other and have substantially the same width with each other.

7. The multi-layer extrusion die of claim 1, wherein said downstream portion of the widening plate has a flat triangular shape.

8. The multi-layer extrusion die of claim 1, wherein said die body has a choker bar having an end facing said flat flow passage and a means for supporting said choker bar.

9. The multi-layer extrusion die of claim 4, wherein said die body has at least one choker bar having an end facing said downstream portion of said widening plate and at least one means for supporting said choker bar.

10. The multi-layer extrusion die of claim 8 or 9 wherein said supporting means includes a nut mounted on said die body and a male screw rod having a head connected with said nut.

11. The multi-layer extrusion die as claimed in claim 1, wherein the flow paths through the widening plates may have variable spacing in a vertical direction.

12. A multi-layer extrusion die for molten resin as claimed in claim 1, wherein said converter is detachably secured to at least one extruder and detachably secured to said die body, and said widening plates are detachably secured in said cavity to said die body.

13. A multi-layer extrusion die for molten resin comprising:
   (a) a die body having an inlet end surface and an outlet end surface, being provided with a cavity opening on said inlet end surface and having a flat flow passage connecting said cavity to said outlet end surface;
   (b) an integrate disposed adjacent to and operatively connected to said die body consisting of a plurality of superimposed widening plates, and being contained in said cavity; said widening plates having flow passages for molten resin; each said flow poassageincluding an inlet portion communicating with the inlet of said die body and a downstream portion which is widened in the lateral direction to a width equal to that of the flat flow passage of said die body with an outlet leading to said flat flow passage, each of said widening plates having an upper and a lower surface parallel with each other; and
   (c) a converter having a plurality of flow passages which are connected with said inlet portions; whereby molten resins are guided into said flow passages of said integrate from said converter, a plurality of molten resin layers are formed at said downstream portion of said widening plates, and said layers are piled up together by passing through said flat flow passage of said die body so as to constitute a multi-layer sheet; and wherein at least one of said widening plates has a portion of said flow passage formed therein, the remaining portions of said flow passage being formed in an adjacent widening plate.

* * * * *